US009162319B2

(12) United States Patent
Lubatschowski et al.

(10) Patent No.: US 9,162,319 B2
(45) Date of Patent: Oct. 20, 2015

(54) METHOD AND DEVICE FOR THE REMOVAL OF MATERIAL BY MEANS OF LASER PULSES

(75) Inventors: Holger Lubatschowski, Gehrden (DE); Tammo Ripken, Wunstorf (DE); Christian Rathjen, Bremen (DE)

(73) Assignee: ROWIAK GMBH, Hanover (DE)

( * ) Notice: Subject to any disclaimer, the term of this patent is extended or adjusted under 35 U.S.C. 154(b) by 1665 days.

(21) Appl. No.: 11/990,888

(22) PCT Filed: Aug. 21, 2006

(86) PCT No.: PCT/EP2006/008225

§ 371 (c)(1), (2), (4) Date: Jul. 7, 2009

(87) PCT Pub. No.: WO2007/022948

PCT Pub. Date: Mar. 1, 2007

(65) Prior Publication Data

US 2009/0294422 A1 Dec. 3, 2009

(30) Foreign Application Priority Data

Aug. 22, 2005 (DE) ......................... 10 2005 039 833

(51) Int. Cl.
*B23K 26/14* (2014.01)
*B23K 26/06* (2014.01)
*B23K 26/38* (2014.01)

(52) U.S. Cl.
CPC ............. *B23K 26/0635* (2013.01); *B23K 26/38* (2013.01)

(58) Field of Classification Search
USPC ............. 219/121.68, 121.69, 121.73, 121.75, 219/121.76, 121.77, 121.85; 604/20, 289, 604/294; 600/310, 473, 476; 607/88, 89, 607/90, 92, 93, 94; 606/4–18, 128
See application file for complete search history.

(56) References Cited

U.S. PATENT DOCUMENTS 3,527,198 A 9/1970 Takaoka
5,312,396 A * 5/1994 Feld et al. ........................ 606/11
5,656,186 A 8/1997 Mourou et al.

(Continued)

FOREIGN PATENT DOCUMENTS

CN 1642864 A 7/2005
DE 19730028 A1 1/1999

(Continued)

OTHER PUBLICATIONS

Chinese Office Action for Application No. 2006800307348 with English Translation, dated Nov. 18, 2010, 25 pages.

*Primary Examiner* — Thien S Tran
(74) *Attorney, Agent, or Firm* — Kilpatrick Townsend & Stockton LLP

(57) ABSTRACT

The invention relates to a method for removing material by means of a laser, wherein a sequence of laser pulses is generated and an area of material to be machined is irradiated with the sequence of laser pulses. Methods of this kind are used to cut a number of different materials. One problem with this method is that thermal or mechanical damage occurs in the surroundings of the area being machined and causes impairment of areas of material that are not being machined. The invention solves this problem by the pulse energy of a single pulse in the sequence of laser pulses being lower than the laser pulse energy required to produce material removal using an isolated laser pulse in the region irradiated with the single laser pulse of the sequence of laser pulses.

24 Claims, 4 Drawing Sheets

(56) References Cited

U.S. PATENT DOCUMENTS

| | | | | |
|---|---|---|---|---|
| 5,786,560 | A * | 7/1998 | Tatah et al. | 219/121.77 |
| 5,882,572 | A | 3/1999 | Lutze et al. | |
| 5,928,221 | A * | 7/1999 | Sasnett et al. | 606/5 |
| 6,160,240 | A | 12/2000 | Momma et al. | |
| 6,509,547 | B1 | 1/2003 | Bernstein et al. | |
| 6,580,054 | B1 * | 6/2003 | Liu et al. | 219/121.68 |
| 6,592,574 | B1 * | 7/2003 | Shimmick et al. | 606/4 |
| 6,787,733 | B2 | 9/2004 | Lubatschowski et al. | |
| 7,247,240 | B2 | 7/2007 | Hashimoto et al. | |
| 2001/0009250 | A1 | 7/2001 | Herman et al. | |
| 2001/0035447 | A1 | 11/2001 | Gartner et al. | |
| 2002/0042639 | A1 * | 4/2002 | Murphy-Chutorian et al. | 607/89 |
| 2002/0088780 | A1 * | 7/2002 | Boyle et al. | 219/121.69 |
| 2002/0099362 | A1 * | 7/2002 | Hohla | 606/5 |
| 2003/0075530 | A1 | 4/2003 | Ganser et al. | |
| 2004/0243111 | A1 * | 12/2004 | Bendett et al. | 606/5 |
| 2005/0155958 | A1 * | 7/2005 | Arai et al. | 219/121.72 |
| 2005/0226287 | A1 * | 10/2005 | Shah et al. | 372/25 |
| 2006/0091125 | A1 * | 5/2006 | Li et al. | 219/121.69 |
| 2006/0095022 | A1 * | 5/2006 | Moll et al. | 606/1 |
| 2006/0179992 | A1 | 8/2006 | Kermani | |
| 2008/0021443 | A1 * | 1/2008 | Bischoff et al. | 606/5 |

FOREIGN PATENT DOCUMENTS

| | | | | |
|---|---|---|---|---|
| DE | 19745294 | A1 | 4/1999 | |
| DE | 10018251 | A1 | 10/2001 | |
| DE | 10300091 | A1 | 7/2004 | |
| DE | 10250015 | B3 | 9/2004 | |
| EP | 0 754 103 | B1 | 11/1997 | |
| EP | 1284839 | A1 | 2/2003 | |
| EP | 1338371 | A1 | 8/2003 | |
| GB | 2218660 | A | 11/1989 | |
| WO | WO 2005058216 | A1 * | 6/2005 | A61F 9/01 |
| WO | WO 2006/018370 | A1 | 2/2006 | |

* cited by examiner

METHOD AND DEVICE FOR THE REMOVAL OF MATERIAL BY MEANS OF LASER PULSES

CROSS-REFERENCE TO RELATED APPLICATIONS

This application is a National Stage of International Application No. PCT/EP2006/008225, filed Aug. 21, 2006, and which claims the benefit of German Patent Application No. 102005039833.2, filed Aug. 22, 2005, the disclosures of both applications being incorporated herein by reference.

BACKGROUND OF THE INVENTION

The use of laser pulses, in particular ultrashort laser pulses with a pulse duration in the range of between approximately $10^{-15}$ s and $5\times10^{-10}$ s, for high-precision laser microstructuring is known.

In U.S. Pat. No. 5,656,186 (EP 0 754 103 B1, filing date Aug. 4, 1994 "method for controlling configuration of laser induced breakdown and ablation"), G. Mourou describes the basic suitability of single, ultrashort laser pulses for machining materials.

BRIEF SUMMARY OF THE INVENTION

The invention relates to a method for removing material by means of a laser, wherein a sequence of laser pulses is generated and a region of material to be removed is irradiated with the sequence of laser pulses. Another aspect of the invention is a device for removing material, comprising a means for generating a sequence of laser pulses and a means for guiding the laser pulses onto a region of material to be removed.

BRIEF DESCRIPTION OF THE DRAWINGS

The invention shall now be described with reference to the below Figures.

DETAILED DESCRIPTION OF THE INVENTION

Figure 1:
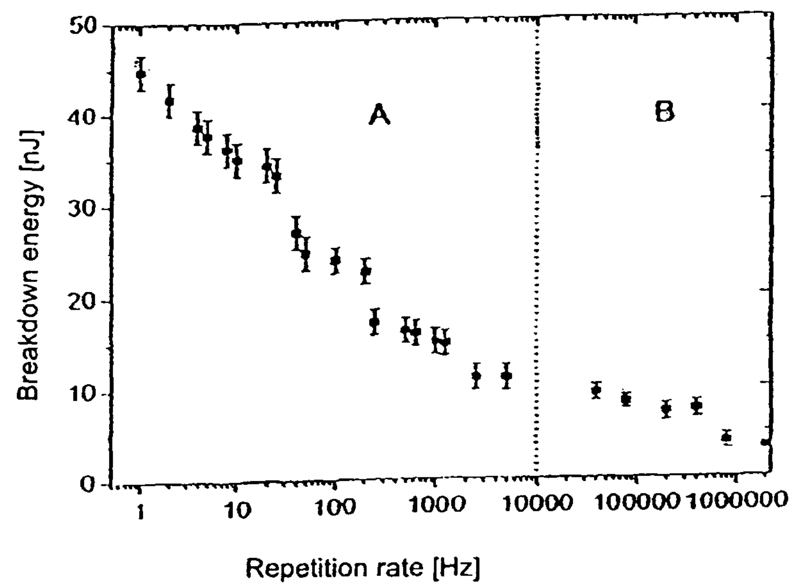
FIG. 1: shows a diagram illustrating the relationship between the pulse energy required for material removal and the laser pulse repetition rate.

In his dissertation entitled "*Mikromaterialbearbeitung mit ultrakurzen Laserpulsen*" (micromachining of materials using ultrashort laser pulses), Cuvillier Verlag Göttingen, 1999, S. Nolte examines aspects of material machining using femtosecond laser pulses.

In general, i.e. in the context of the present invention also, ultrashort laser pulses can be used for cutting, ablation and structuring of materials (e.g. metal materials), and for modifying the properties of materials (e.g. altering the refractive index in glass).

The special advantages of material machining using ultrashort laser pulses (fs laser pulses) is shown, in particular, by extremely precise cutting and/or ablation of materials involving less thermal or mechanical damage than with a number of other material machining methods. By focusing the ultrashort laser pulses, energy is deposited at the focal point in a very limited space by generating a microplasma, and a cutting effect or material ablation is achieved by "photodisruption". Ablation rates in the sub-μm range can be achieved with cutting widths of less than 500 nm. Due to a nonlinear interaction mechanism during photodisruption, the ablation of material is largely independent of the properties of the material. By using fs laser pulses, it is also possible, in particular, to machine materials that have a high thermal conductivity (such as metals, for example) as well as materials that have a low degree of laser light absorption (such as polymers, for example).

One problem in the laser machining of materials is that the laser energy not only allows material removal to be achieved in the irradiated region, but also causes generally undesired modifications of material in adjacent areas. The extent and magnitude of these material modifications depend critically on how high the energy of the laser beam is and how that energy is distributed over time.

In EP 1 284 839 A1 and U.S. Pat. No. 6,787,733, a method for laser machining of materials is described in which the result of machining in controlled online in order to optimize material machining and to minimize any undesired side-effects. Although online control of the machining operation is possible and any side-effects occurring can be observed with this method, it is not possible with this method to avoid regions of material surrounding the region to be machined from being influenced by the laser radiation.

The interaction mechanism when machining material by means of short, intensive laser pulses is based on "photodisruption", which occurs when light is focused to intensities in the order of $10^{11}$ to $10^{12}$ W/cm$^2$. At such high levels of intensity, almost any kind of material is abruptly ionized due to multi-photon absorption (plasma generation). When this process occurs in transparent material, it is referred to as "optical" breakdown.

The explosive expansion of the laser-induced plasma causes a strong pressure front and—if the process occurs in a fluid environment—a cavitation bubble. The pressure front and likewise the cavitation bubbles can involve considerable potential for mechanical damage to the surrounding material. However, this potential for damage by a single laser pulse scales in proportion to the laser pulse energy.

A high level of intensity is necessary to generate optical breakdown, however. The shorter a laser pulse, the less energy it transports at the same level of intensity. Short laser pulses are therefore an essential prerequisite for achieving photodisruption with a high level of precision and with minimal mechanical side-effects.

However, the laser pulse duration, i.e. the exposure time to laser radiation, is also of critical importance in respect of the thermal damage to the irradiated material. If the duration of laser irradiation is so short that no significant amount of thermal energy is lost to thermal diffusion from the absorption volume during irradiation, such a situation is referred to as "thermal confinement". The maximum irradiation time (laser pulse duration) at which the conditions for "thermal confinement" are maintained is also referred to as the thermal relaxation time $\tau_R$ and is defined by the relationship:

$$\tau_R = \frac{\delta^2}{4\kappa}$$

where

δ: is the optical depth of penetration into the irradiated material; in the case of disruption in transparent media, δ corresponds to the expansion of the non-linear absorption zone κ: is the thermal diffusion constant of the irradiated material or tissue.

If the exposure time (laser pulse duration) is significantly shorter than $\tau_R$, the zone of thermal influence exerted by the laser pulse on the irradiated material is principally determined by the optical depth of penetration δ. If the laser pulse duration is significantly longer than $\tau_R$, the thermal zone of influence extends beyond the optical depth of penetration, due to thermal diffusion.

When machining metals having an optical depth of penetration of only a few nanometers and in which a relatively high rate of thermal diffusion prevails, the use of picosecond or even femtosecond durations is essential if the zone of thermal influence is to be kept as small as possible.

However, the reduction of laser pulse duration is currently subject to technological limits and does not prevent the surrounding regions from being exposed to undesired influences.

It In order to achieve material removal, it is basically essential that a specific amount of energy be delivered by the laser pulse to the region being removed. The amount of said energy is dependent on the material. When removing material along a line or plane, a plurality of laser pulses with appropriate laser pulse energy are placed adjacent each other in order to obtain a line or plane of separation. Depending on the properties of the material, the disruptive effect of the individual laser pulses may cause undesired mechanical changes in the material. These include tearing of the material, thus causing an irregular cut surface, or the formation of gas bubbles, which can likewise affect the geometry of cut in disadvantageous ways. The extent of undesired changes to the material scales in proportion to the energy of the individual laser pulses.

There is therefore a need to provide a method for material machining, in which the influence on regions adjacent to the machined region is further reduced, or prevented altogether in the ideal case.

The need is satisfied according to the invention by a method of the kind initially specified, in which the pulse energy of a single pulse in the sequence of laser pulses is lower than the laser pulse energy required to produce material removal using an isolated laser pulse in the region irradiated with the single laser pulse of the sequence of laser pulses.

The invention utilizes the finding that the total energy required for removal need not necessarily be introduced by a single laser pulse at one location. Instead, this total amount of energy can be introduced by a plurality of laser pulses generated, for example, by one and the same laser, and which are successively delivered to the same location within the region being removed. This makes it possible to achieve material removed by means of several successive laser pulses of low pulse energy, and hence to avoid damage to irradiated material in the surrounding region.

It has been found that the energy for material removal, in other words the total minimum energy required to achieve material removal, decreases with increasing repetition rate. It is thus possible at high repetition rates to achieve material removal with a substantially lower laser pulse energy than at low repetition rates.

In particular, the laser pulse energy can be reduced by reducing the laser pulse intensity and/or the laser pulse duration. This means that the laser pulse intensity and/or the laser pulse duration is less in the method according to the invention than the laser pulse intensity and/or the laser pulse duration required by conventional technology in order to achieve material removal. In this way, it is possible to achieve a reduction in the laser pulse energy in a simple manner.

It is particularly advantageous if the irradiated area is spatially overlapped by two or more consecutive laser pulses of the sequence of laser pulses. By virtue of this spatial overlapping, the laser pulse energy of two or more laser pulses is introduced into the area of overlap and by addition can therefore result in a total amount of energy with which material separation is achieved. This finding departs from the previous approach in which the laser pulses are spatially and temporally spaced apart as far as possible from each other in order to separate the thermal influence of each individual laser pulse from that of a subsequent laser pulse, and by means of such overlapping achieves a reduction in undesired mechanical and thermal influence, in that the laser pulse energy of each individual laser pulse is simultaneously reduced.

It is particularly advantageous in this respect when the irradiated area is spatially overlapped to 100% by at least two consecutive laser pulses of the sequence of laser pulses, or to an extent ranging between 10% and 100%, preferably to about 70% to 99%, in particular to about 92% to 99%. The overlap of the laser pulses basically depends on the diameter of the laser beam at the focus (focused beam diameter), the laser pulse repetition rate and the relative feed speed between the material to be removed and the laser. The percentage overlap is defined in this connection as $$\text{overlap} = 100 \times \left(1 - \frac{\text{feed speed}}{\text{laser pulse repetition rate} \times \text{focused beam diameter}}\right)$$

The values stated are suitable for removing a large number of different materials. A spatial overlap of 100% can be embodied in such a way, for example, that two or more laser pulses overlap to 100%, followed by the laser beam being moved relative to the machined material and then two or more laser pulses being delivered that overlap 100%. As an alternative to this discontinuous feed, it is advantageous for many applications if a continuous feed movement occurs and is adjusted such that an overlap of 70-99%, in particular 92% to 99%, is achieved for a given laser pulse repetition rate and diameter of the focused laser beam.

It is also advantageous if the laser pulse energy, the laser pulse intensity, the dimensions of the focused area and/or the laser pulse duration of a single laser pulse, the laser pulse repetition rate of the sequence of laser pulses and/or the feed speed between the laser beam and the material to be machined are preset according to the characteristics of the material. One key dimension of the focus area to be preset is frequently the diameter of the laser beam at the focus, for example, or the length of the focus area in the beam direction, which is influenced by the aperture, among other factors. The optimal parameters depend on the properties of the material to be machined, in particular on the thermal diffusion constant and the relaxation time of the material. As a basic principle, it is particularly advantageous in this regard to set higher laser pulse repetition rates for high thermal diffusion constants than for lower thermal diffusion constants. The opposite relationship exists between the relaxation time and the laser pulse repetition rate: lower laser pulse repetition rates can usually be selected in the case of long relaxation times than in the case of short relaxation times.

It is also advantageous if the laser pulse repetition rate of the sequence of laser pulses is so high that, within a duration specific to the material to be removed, for example the thermal relaxation time, at least two laser pulses are delivered to the material to be removed. In this way, the laser pulse energy of the two laser pulses delivered within the material-specific duration can accumulate and bring about removal of the material. The thermal and mechanical damage can be reduced in this case by a plurality of laser pulses being delivered, within the material-specific duration, onto a region of the material to be removed, and by selecting the energy of each of these laser pulses accordingly in order to introduce the total accumulated energy required for material removal precisely by means of this plurality of laser pulses.

It has found to be particularly advantageous if the laser pulse repetition rate is greater than 10 Hz, in particular greater than 50 Hz and preferably between 100 Hz and 50 MHz. These ranges for the laser pulse repetition rate already bring about a noticeable reduction in the laser pulse energy required per laser pulse and can therefore reduce the mechanical damage significantly.

Particular note must be made of the fact, in the aforementioned embodiments, that there is a mathematical relationship between the overlap, the laser pulse repetition rate, the dimensions of the focus area, for example the diameter of the laser beam at the focus, and the feed speed. The critical variable in the last analysis, namely the number of laser pulses introduced at one location of material machining, and the overlap between them, can be influenced by varying the other respective parameters. For example, the number of pulses can be individually increased by reducing the feed speed, by increasing the diameter of the laser beam at the focus or by increasing the laser pulse repetition rate, if the two other parameters in each case are kept constant. By reducing the diameter of the laser beam at the focus, increasing the feed speed and reducing the laser pulse repetition rate, it is possible to achieve a reduction in the number of laser pulses per location point on the line along which the material is machined.

It is also advantageous if the laser pulse energy, the laser pulse intensity, the dimensions of the focused area, the laser pulse duration of a single laser pulse, the laser pulse repetition rate of the sequence of laser pulses and/or the feed speed between the laser beam and the material to be machined is altered during the machining operation. In this embodiment, it is possible for example to set the laser pulse energy of the single laser pulses such that, depending on the overlap between laser pulses, the precise amount of energy required for material removal at the location currently being machined is introduced to the material. It can be advantageous here if the laser pulse energy is set according to the predetermined or preset laser pulse repetition rate and/or feed speed. Such settings can be effected automatically, or manually by the user.

It is especially advantageous, in the developments of the method involving adjustable laser pulse repetition rate and adjustable laser pulse energy, if a first laser pulse energy is set for a first laser pulse repetition rate, and a second laser pulse energy which is lower than the first laser pulse energy is set for a second laser pulse repetition rate which is higher than the first laser pulse repetition rate. In this way, the laser pulse energy is automatically adapted to the laser pulse repetition rate, and the respective amount of cumulative energy required for achieving material separation is introduced.

It is particularly advantageous in this regard if

- the laser pulse repetition rate is automatically set according to the laser pulse energy, or
- the laser pulse energy is automatically set according to the laser pulse repetition rate,
- the laser pulse repetition rate is automatically set according to the feed speed, or
- the laser pulse repetition rate, the laser pulse energy and/or the feed speed are automatically set according to at least one property of the material to be removed.

This development of the method allows the most critical parameters for material removal to be set independently of each other, or to be automatically set correctly according to the material to be machined. In the method according to the invention, it is possible, for example, to refer to a database containing the ideal parameters for each typical material, and then for these parameters to be set by selecting a material. Alternatively, the total energy required for material removal can be read from a database and the respective other parameters selected in such a way, on the basis of parameters selected by the user, that this required amount of total energy is reached.

Another aspect of the invention consists in a method of the kind specified initially or above, in which, in the starting region of the removal operation, the total energy introduced at one location on the material to be machined is greater than in a region during the further course of the removal operation.

This development is based on the finding that, in order to achieve initial material removal in a material, a greater amount of total energy is required to achieve an initial material removal effect, and less total energy is subsequently required in order to maintain and extend this initial removal of material. It is therefore advantageous, after using an initially high energy level of laser pulse energy in the starting region of the removal operation in order to achieve the initial material separation, to subsequently reduce the laser pulse energy to a lower level that is sufficient to maintain and continue the initial material separation, in order in this way to minimise the damage along the line or plane of removal.

It is advantageous, in particular, if the laser pulse energy, the laser pulse repetition rate and/or the number of laser pulses delivered to one location on the material is higher and/or the feed speed between the laser beam and the material to be machined is lower in the starting region of the removal operation than in the further course of the removal operation. The laser pulse energy is the product of the laser pulse intensity and the laser pulse duration. In order to achieve initial removal in the starting region, a higher laser pulse intensity can therefore be set than during the subsequent course of the removal operation, in order to maintain and continue removal.

In the same manner, given a constant laser pulse intensity, the laser pulse duration could be increased in the starting region and reduced in the further course of removal and/or the laser pulse repetition rate could be increased in the starting region and reduced in the further course of removal.

Another development of the method consists in the laser pulse intensity and/or the laser pulse duration of a single laser pulse being greater in the starting region of the removal operation than in a region during the further course of the removal operation. This development of the method is able, in the same manner, to perform the initial removal with a high laser pulse energy and further removal with a lower laser pulse energy than in the previously described embodiment, but with variation in other parameters.

It is particularly advantageous for the inventive method if the laser pulse duration is less than ten picoseconds, in particular less than one picosecond. For many materials, the femtosecond laser machining thus achieved permits laser pulse energies and laser pulse repetition rates that are particularly advantageous, and generally avoids any undesired forms of damage.

It is also advantageous for the inventive method if the laser beam is focused, preferably with an optical system having a numerical aperture that is at least so large that material removal is achieved under the surface of a semi- or fully transparent material, without areas of material lying above or below the removal area being damaged. This makes it possible to produce a laser beam focus and to avoid removal of or damage to the material in the beam direction upstream and downstream from this laser beam focus, whereas such material removal is achieved at the laser beam focus.

Finally, it is advantageous for the inventive method if the removal operation is observed and, if removal performance declines, the total energy introduced is increased by altering one of the previously listed parameters that are relevant for removal performance. In this context, "observation" is understood to mean the direct visual or sensory observation of the cut, or also the observation and monitoring of technical parameters, for example equipment performance data, by a user or automatically, in order to infer an alteration in material removal performance from any alteration in these parameters.

Another aspect of the invention is a device of the kind initially specified, which is developed according to the invention such that the means for generating a sequence of laser pulses is so configured that the pulse energy of a single pulse in the sequence of laser pulses is lower than the laser pulse energy required to produce material removal using an isolated laser pulse in the region irradiated with the single laser pulse of the sequence of laser pulses. By this means, the laser pulse energy of a single laser pulse can be kept at a low level, thus achieving material removal with the method according to the invention. For the advantages and effects of the device thus embodied, we refer to the previous description of the correspondingly embodied method.

The inventive device can be developed such that a means for generating the sequence of laser pulses is configured to reduce the laser pulse energy by reducing the laser pulse intensity and/or the laser pulse duration.

The inventive device can be further developed to include feeding means for generating a relative movement between the laser beam and the material to be removed and means for generating a laser pulse repetition rate, which co-operate in such a way that the irradiated region is spatially overlapped by two consecutive laser pulses of the sequence of laser pulses. This achieves the advantageous inventive overlapping of at least two consecutive laser pulses. The feeding means is preferably designed in such a way that it can be operated according to the laser pulse repetition rate.

It is also advantageous if the feeding means and the means for generating a laser pulse repetition rate co-operate in such a way that the irradiated region is spatially overlapped to 100% by two consecutive laser pulses of the sequence of laser pulses, preferably to between 10% and 100% or to a range between 70% to 99%, in particular to between 92% and 99%. Reference is made in this regard to the preceding description of the respective form of the method.

The inventive device is preferably provided with control means for setting the laser pulse energy, the laser pulse intensity and/or the laser pulse duration of a single laser pulse, the laser pulse repetition rate of the sequence of laser pulses, the dimensions of the focus area of the laser beam at the machining location, for example the diameter of the laser beam at the focus, and/or the feed speed between the laser beam and the material to be machined, depending on the properties of the material. This control means can be actuated automatically by the device in respect of one of the parameters, depending on other parameters, or can be actuated manually by a user.

It is particularly advantageous in this regard if the control means is configured in such a way that the laser pulse repetition rate of the sequence of laser pulses is so high that, within a duration specific to the material to be removed, for example its thermal relaxation time, at least two laser pulses are delivered to the material to be removed. This achieves the advantageous accumulation of two or more laser pulses within the material-specific duration, thus removing material in a particularly gentle and careful manner.

In particular, the control means can be configured in such a way that the laser pulse repetition rate size can be set to greater than 10 Hz, in particular to greater than 50 Hz and preferably to between 100 Hz and 50 MHz. Reference is made in this regard to the preceding form of the method.

It is also advantageous if the control means is configured to alter at least one of the six parameters listed in the foregoing during the machining operation. In this way, the total energy and/or the laser pulse energy can be set according to the properties of the material or depending on other parameters of the cutting operation.

The control means can preferably be configured such that

- the laser pulse repetition rate is automatically set according to the laser pulse energy, or
- the laser pulse energy is automatically set according to the laser pulse repetition rate,
- the laser pulse energy and/or the laser pulse repetition rate is automatically set according to the speed of movement, or
- the laser pulse repetition rate, the laser pulse energy and/or the feed speed are automatically set according to at least one property of the material to be removed.

In particular, it is advantageous for the inventive device if the control means is configured to control at least one of the six previously listed parameters (laser pulse repetition rate, laser pulse energy, laser pulse intensity, laser pulse duration, dimensions of the focus area and feed speed) in such a way that, in the starting region of the removal operation, the total energy introduced at one location on the material to be machined is greater than in a region during the further course of the removal operation.

It is also advantageous to develop the inventive device by configuring the control means in order to set the laser pulse energy, the laser pulse repetition rate and/or the number of laser pulses delivered to one location on the material to a higher level higher and/or the feed speed between the laser beam and the material to be machined to a lower level in the starting region of the removal operation than in the further course of the removal operation.

The control means is preferably configured to set the laser pulse intensity higher and/or the laser pulse duration of a single laser pulse longer in the starting region of the removal operation than in the further course of the removal operation.

It is advantageous, in particular, if the means for generating a sequence of laser pulses is configured to produce a laser pulse duration of less than ten picoseconds, preferably less than one picosecond.

The device according to the invention can be developed by providing it with focusing means for focusing the laser beam, preferably with an optical system having a numerical aperture that is at least so large that material removal is achieved under the surface of a semi- or fully transparent material without regions of material lying above or below the removal region being damaged.

Finally, the inventive device can be developed by providing it with an observation device for observing the removal operation, said observation device co-operating with the means for generating a sequence of laser pulses, the means for guiding the laser pulses onto an area of material to be removed and/or with the feeding means in such a way that, if the removal performance declines, the total energy introduced is increased by altering at least one of the six aforementioned parameters. Reference is made in this regard to the preceding description of the method involving observation of the removal operation.

With regard to the developments of the inventive device, and to their advantages, action mechanisms and preferred embodiments, reference is made to the description in the foregoing of the characteristics of the respective development of the method.

Referring to FIG. 1, it can be seen from this diagram, part A of which was obtained using a laser pulse duration of 150 fs, a wavelength of 780 nm and an aperture of 0.6 and part B of which with a laser pulse duration of approximately 15 fs, a wavelength of 800 nm and an aperture of 0.5, that, for a laser pulse repetition rate of 1 Hertz, approximately 45 nJ of energy is required to achieve removal of material. This required level of energy decreases with increasing laser pulse repetition rate to reach a value less than 5 nJ for a laser pulse repetition rate of 1 MHz.

Figure 2:
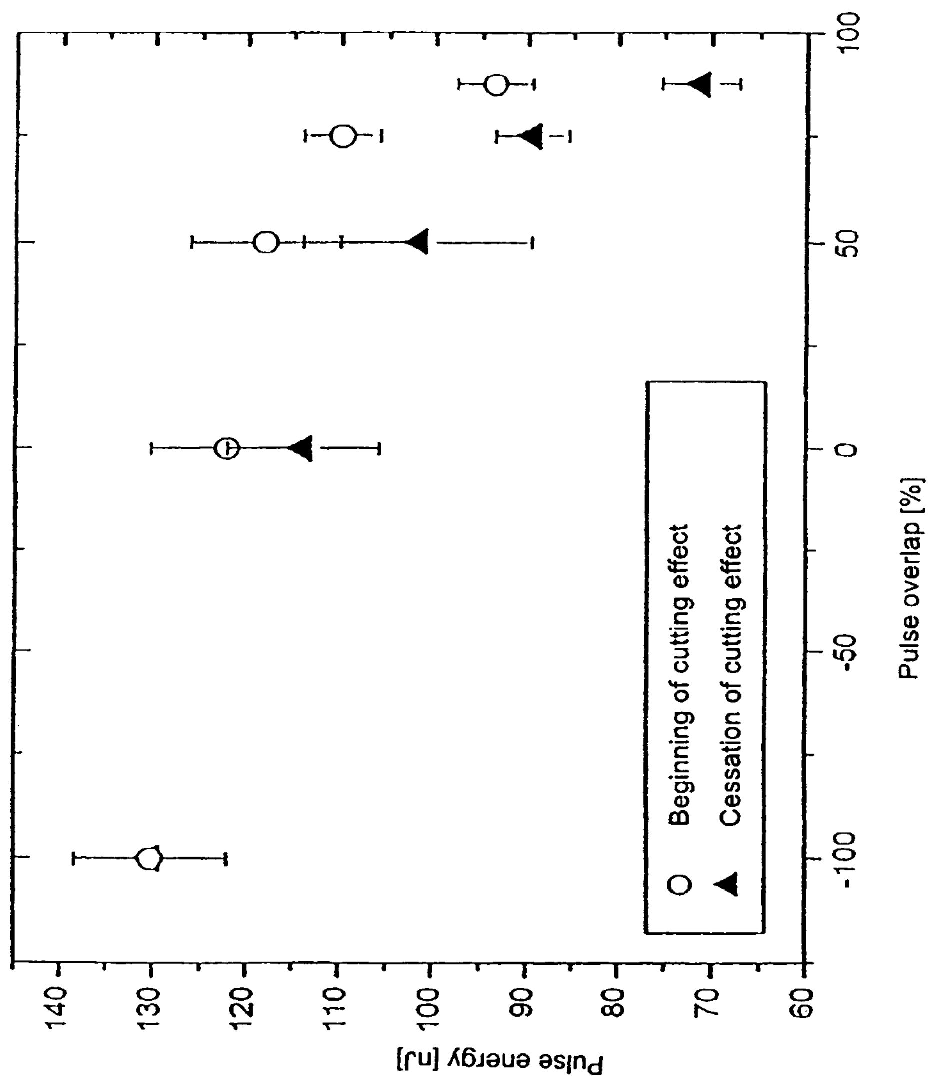
FIG. 2: shows a diagram illustrating the relationship between the laser pulse energy required at the beginning of material removal and the minimum laser pulse energy required to continue material removal with a laser pulse overlap ranging between −100% and +100%.

FIG. 2 shows the dependence of the laser pulse energy required at the beginning of material removal ("Beginning of cutting effect") and of the minimum laser pulse energy required to continue material removal ("Cessation of cutting effect") on the laser pulse overlap ranging from −100% to +100%. A negative pulse overlap means in this connection that a non-irradiated region of material lies between two successive pulses; a pulse overlap of −100%, for example, means that said non-irritated region is exactly equal to the focal diameter.

One can see that, when the single pulses are sufficiently spaced apart from each other (negative pulse overlap), the commencement and cessation of the cutting effect occurs at the same pulse energy, i.e. the pulses exert no mutual influence no each other. However, the larger the pulse overlap that is selected, the lower is the level of pulse energy required for cutting to commence and the lower the level of pulse energy at which cutting ceases. The pulse energy required for cutting to commence and the pulse energy at which cutting ceases are also the further apart the greater the degree of pulse overlap. Hence, the greater the pulse overlap chosen, the lower the level of pulse energy initially needed for cutting, and the lower the level of pulse energy needed to continue the cutting operation.

Figure 3:
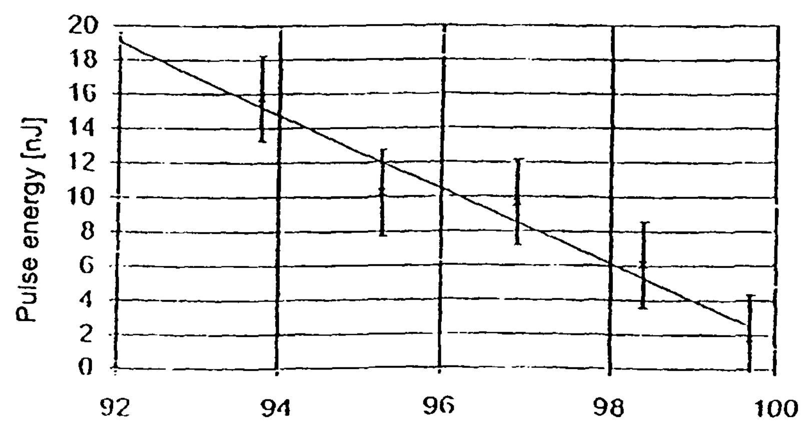
FIG. 3: shows a diagram illustrating the relationship between the laser pulse energy required for material removal, and laser pulse overlaps ranging from 92% to 100%.

FIG. 3 shows the measurement results for the cutting operation at high levels of pulse overlap. The chart plots the results of five test series conducted with different degrees of overlap and with a best fit line drawn through these series of measurements. One can see that a single laser pulse must have a pulse energy of approximately 19 nJ in order to conduct the method with a pulse overlap of 92%. This required level of single laser pulse energy decreases with increasing overlap and at an overlap of approximately 99.5% reaches a value of only 2 nJ.

Figure 4:
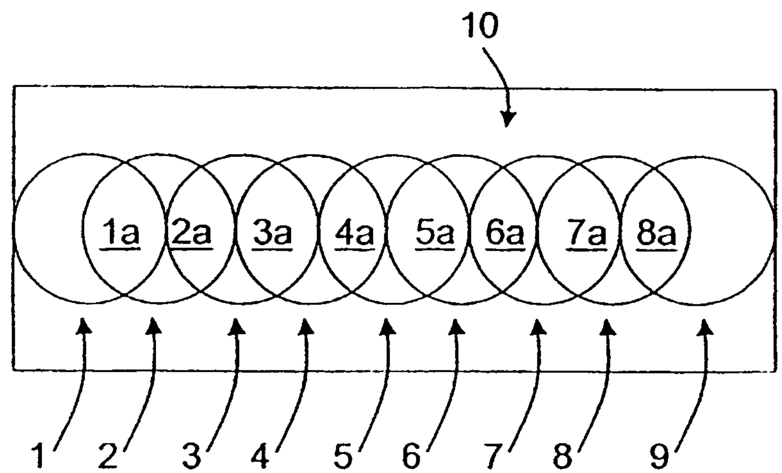
FIG. 4: shows a schematic view of linear material removal with a laser pulse overlap of 50%.

FIG. 4 shows a material 10 to be removed and a sequence of single laser pulses 1-9 that are used to remove this material. The single laser pulses are shown schematically in the configuration of their focus area. Single laser pulses 1-9 are successively applied to the material from left to right. In doing so, the laser pulses overlap in regions 1-8*a*. In the form of the method illustrated in FIG. 4, the laser pulse repetition rate, the feed speed and the focal diameter are set in such a way that a 50% overlap results, i.e. laser pulses 1 and 2 overlap in region 1*a*, laser pulses 2 and 3 overlap in region 2*a*, etc. In this way, each region along the line of cut is irradiated by two laser pulses.

Figure 5:
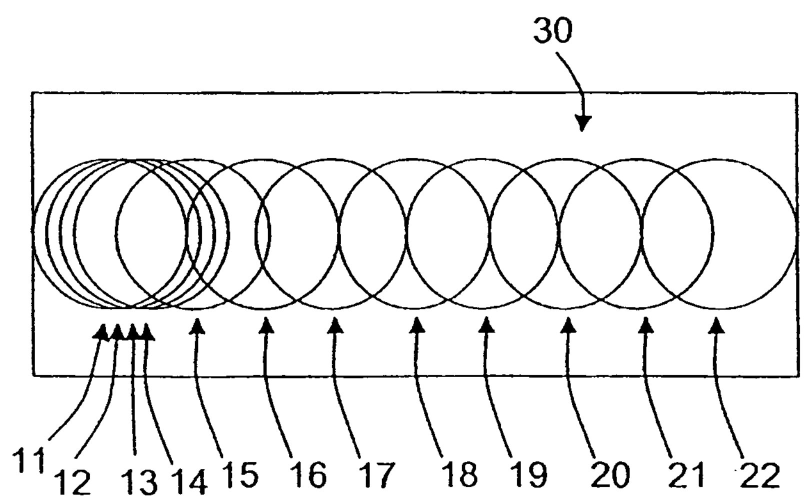
FIG. 5: shows a schematic view of linear material removal with a variable laser pulse overlap in the starting region and in the further course of the removal operation.

FIG. 5 shows a sequence of laser pulses 11-22 which are used to remove material from a block of material 30.

Laser pulses 11-22 are applied in ascending order from left to right. It can be seen that laser pulses 11-14 have a greater degree of overlap than the subsequent laser pulses 15-22. This serves to introduce a greater level of total energy in the left-hand starting region of the removal operation, necessary for initial removal, than in the further course of the operation to the right along the line of removal, where only a lower level of total energy is required for the removal region in order to continue the initial removal.

The accumulation of laser pulses 11-14 shown in FIG. 5 can be achieved, for example, by selecting a higher laser pulse repetition rate in this starting region, or by setting a reduced feed speed in this starting region.

Figure 6:
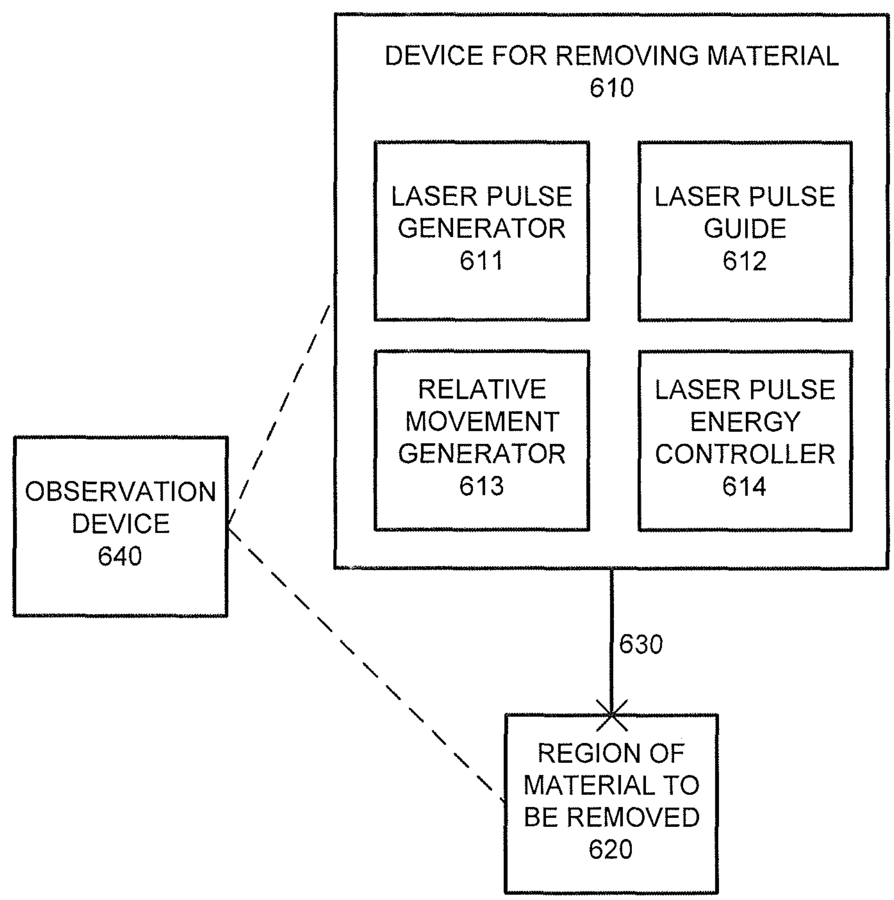
FIG. 6: shows an exemplary system diagram in accordance with some embodiments of the invention.

FIG. 6 shows a system in accordance with some embodiments of the invention. The system comprises a device for removing material 610. The device for removing material 610 comprises a laser pulse generator 611 and a laser pulse guide 612. The laser pulse generator 611 may be used to generate a sequence of laser pulses. The laser pulses may be of varying energies, intensities, and durations. The laser pulse guide 612 may be used to guide the laser pulses onto a region of material to be removed. In some embodiments, the device for removing material 610 may also include a relative movement generator 613 between the laser beam 630 and the material to be removed 620. In some embodiments, the device for removing material 610 may also comprise a laser pulse energy controller 614 which may be used to reduce or increase the pulse energy of laser 630. Additionally, in some embodiments, an observation device 640 may be used to observe the removal operation and cooperate with the device for removing material 610.

The invention claimed is:

1. A method for removing material by means of a laser, wherein a sequence of laser pulses is generated and an area of material to be machined is irradiated with the sequence of laser pulses, characterized in that a pulse energy of each pulse in the sequence of laser pulses is lower than a laser pulse energy required to produce the removal of material by an isolated laser pulse in the area irradiated by a single pulse of the sequence of laser pulses, wherein the irradiated area is spatially overlapped by two consecutive laser pulses of the sequence of laser pulses to an extent of less than 50%, wherein each of the two consecutive laser pulses have a substantially similar duration and intensity, wherein a continuous ablation area is removed from the material by the sequence of laser pulses, wherein the material is removed through the accumulation of thermal energy over the two consecutive laser pulses, wherein an area that is not spatially overlapped by the two consecutive laser pulses is removed from the material through diffusion of the thermal energy over the irradiated area, and wherein a repetition rate of the two consecutive laser pulses is below 100 MHz.

2. The method of claim 1,
characterized in that the laser pulse energy is reduced by reducing the laser pulse intensity or the laser pulse duration.

3. The method of claim 1,
characterized in that the irradiated area is spatially overlapped by at least two consecutive laser pulses of the sequence of laser pulses.

4. The method of claim 1,
characterized in that the laser pulse energy, the laser pulse intensity, the dimensions of a focused area, the laser pulse duration of a single laser pulse, the laser pulse repetition rate of the sequence of laser pulses or a feed speed between a laser beam of the laser and the material to be machined is preset according to the properties of the material.

5. The method of claim 1,
characterized in that at least two laser pulses are delivered to the material to be removed within a duration specific to the material to be removed.

6. The method of claim 5,
characterized in that the laser pulse repetition rate is greater than 10 Hz.

7. The method of claim 1,
characterized in that the laser pulse energy, the laser pulse intensity, the dimensions of a focused area, the laser pulse duration of a single laser pulse of the sequence of laser pulses, the laser pulse repetition rate of the sequence of laser pulses or a feed speed between a laser beam of the laser and the material to be machined is altered during the machining operation.

8. The method of claim 7,
characterized in that a first laser pulse energy is set for a first laser pulse repetition rate and a second laser pulse energy that is lower than the first laser pulse energy is set for a second laser pulse repetition rate that is higher than the first laser pulse repetition rate.

9. The method of claim 8,
characterized in that
a. the laser pulse repetition rate is automatically set according to the laser pulse energy, or
b. the laser pulse energy is automatically set according to the laser pulse repetition rate,
c. the laser pulse repetition rate is automatically set according to the feed speed, or
d. the laser pulse repetition rate, the laser pulse energy or the feed speed are automatically set according to at least one property of the material to be removed.

10. The method of claim 1,
characterized in that, in a starting region for the removal operation, the total energy introduced at one location on the material to be machined is greater than in a region during the further course of the removal operation.

11. The method of claim 1,
characterized in that the laser pulse energy or the laser pulse repetition rate is higher or a feed speed between a laser beam of the laser and the material to be machined is lower in the starting region for the removal operation than in the further course of the removal operation.

12. The method of claim 1,
characterized in that the laser pulse intensity is higher or the laser pulse duration of a single laser pulse in a starting region of the removal operation is longer than in a region during the further course of the removal operation.

13. The method of claim 1,
characterized in that the laser pulse duration is less than ten picoseconds.

14. The method of claim 1,
characterized in that a laser beam of the laser is focused such that material removal is achieved under the surface of a semi or fully transparent material, without regions of material lying which are above or below the removal region being damaged.

15. The method of claim 7,
characterized in that the removal operation is observed and a decline in removal performance causes the total energy introduced to be increased by altering one of the parameters referred to in claim 7.

16. A method for removing material by means of a laser, wherein a sequence of laser pulses is generated and an area of material to be machined is irradiated with the sequence of laser pulses,
characterized in that the pulse energy of each pulse in the sequence of laser pulses is lower than the laser pulse energy required to produce the removal of material by an isolated laser pulse in the area irradiated by a single pulse of the sequence of laser pulses, wherein each of the two consecutive laser pulses have a substantially similar duration and intensity, wherein a continuous ablation area is removed from the material by the sequence of laser pulses, wherein the material is removed through the accumulation of thermal energy over the two consecutive laser pulses, wherein an area that is not spatially overlapped by the two consecutive laser pulses is removed from the material through diffusion of the thermal energy over the irradiated area, and wherein a repetition rate of the two consecutive laser pulses is below 100 MHz; and
wherein the laser pulses of the sequence of laser pulses are generated by the same laser.

17. The method of claim 16, wherein the irradiated area is spatially overlapped by two consecutive laser pulses of the sequence of laser pulses to an extent of less than 50%.

18. A method for removing material by means of a laser, wherein a sequence of laser pulses is generated and an area of material to be machined is irradiated with the sequence of laser pulses,
characterized in that the pulse energy of each pulse in the sequence of laser pulses is lower than the laser pulse energy required to produce the removal of material by an isolated laser pulse in the area irradiated by a single pulse of the sequence of laser pulses, wherein each of the two consecutive laser pulses have a substantially similar duration and intensity, wherein a continuous ablation area is removed from the material by the sequence of laser pulses, wherein the material is removed through the accumulation of thermal energy over the two consecutive laser pulses, wherein an area that is not spatially overlapped by the two consecutive laser pulses is removed from the material through diffusion of the thermal energy over the irradiated area, and wherein a repetition rate of the two consecutive laser pulses is below 100 MHz, and
wherein the removal of material is effected by photo disruption.

19. The method of claim 18, wherein the irradiated area is spatially overlapped by two consecutive laser pulses of the sequence of laser pulses to an extent of less than 50%.

20. A method for removing material by means of a laser, wherein a sequence of laser pulses is generated and an area of material to be machined is irradiated with the sequence of laser pulses, characterized in that the pulse energy of each pulse in the sequence of laser pulses is lower than the laser pulse energy required to produce the removal of material by an isolated laser pulse in the area irradiated by a single pulse of the sequence of laser pulses, wherein each of the two consecutive laser pulses have a substantially similar duration and intensity, wherein a continuous ablation area is removed from the material by the sequence of laser pulses, wherein the material is removed through the accumulation of thermal energy over the two consecutive laser pulses, wherein an area that is not spatially overlapped by the two consecutive laser pulses is removed from the material through diffusion of the thermal energy over the irradiated area, and wherein a repetition rate of the two consecutive laser pulses is below 100 MHz, and wherein the sequence of laser pulse comprises more than two laser pulses applied at a constant laser pulse repetition rate.

21. The method of claim 20, wherein the irradiated area is spatially overlapped by two consecutive laser pulses of the sequence of laser pulses to an extent of less than 50%.

22. A method for removing material by means of a laser, wherein a sequence of laser pulses is generated and an area of material to be machined is irradiated with the sequence of laser pulses, characterized in that the pulse energy of each pulse in the sequence of laser pulses is lower than the laser pulse energy required to produce the removal of material by an isolated laser pulse in the area irradiated by a single pulse of the sequence of laser pulses, wherein each of the two consecutive laser pulses have a substantially similar duration and intensity, wherein a continuous ablation area is removed from the material by the sequence of laser pulses, wherein the material is removed through the accumulation of thermal energy over the two consecutive laser pulses, and wherein an area that is not spatially overlapped by the two consecutive laser pulses is removed from the material through diffusion of the thermal energy over the irradiated area, and wherein a repetition rate of the two consecutive laser pulses is below 100 MHz, and wherein each two adjacent laser pulses in the sequence of laser pulses have a constant percentage of overlap.

23. The method of claim 22, wherein the irradiated area is spatially overlapped by two consecutive laser pulses of the sequence of laser pulses to an extent of less than 50%.

24. The method of claim 1, wherein the percentage of overlap is defined as $$100 \times \left(1 - \frac{\text{feed speed}}{\text{laser pulse repetition rate} \times \text{focused beam diameter}}\right).$$

* * * * *